United States Patent [19]

Stafford

[11] 4,133,094
[45] Jan. 9, 1979

[54] METHOD OF JOINING A TANK AND SKIRT SUPPORT TOGETHER

[75] Inventor: Donald C. Stafford, Hinsdale, Ill.

[73] Assignee: Chicago Bridge & Iron Company, Oak Brook, Ill.

[21] Appl. No.: 826,685

[22] Filed: Aug. 22, 1977

[51] Int. Cl.² ............................................. B23P 11/02
[52] U.S. Cl. .................................... 29/447; 29/526 R; 29/DIG. 35; 114/74 A; 220/69
[58] Field of Search ................... 29/447, 526; 248/146, 248/152, 359; 220/18, 69, 9 LG, 15; 114/74 A

[56] References Cited

U.S. PATENT DOCUMENTS

| | | | |
|---|---|---|---|
| 1,987,341 | 1/1935 | Kachel | 29/447 X |
| 2,301,495 | 11/1942 | Abegg | 29/DIG. 35 UX |
| 2,769,563 | 11/1956 | Weil | 220/69 X |
| 2,802,596 | 8/1957 | Weil | 220/69 |
| 2,967,352 | 1/1961 | Weil | 220/69 X |
| 3,623,196 | 11/1971 | Bongenaar et al. | 29/447 X |
| 3,680,323 | 8/1972 | Bognaes | 220/15 X |
| 3,968,764 | 7/1976 | Kvamsdal et al. | 114/74 A |
| 4,011,964 | 3/1977 | Tonnessen | 220/9 LG X |

Primary Examiner—Charlie T. Moon
Attorney, Agent, or Firm—Merriam, Marshall & Bicknell

[57] ABSTRACT

A method of supporting a metal tank having a circular horizontal section which comprises providing the tank with a horizontal ring-like portion having a substantially upright surface, forming a metal substantially upright skirt having a top portion with an internal surface which matches the tank ring-like surface and which has an internal diameter at ambient temperature at matching locations slightly less than the diameter of the tank ring-like surface at ambient temperature, heating the skirt top portion, or cooling the tank ring-like surface, or both until the internal diameter of the skirt top portion is larger than the diameter of the tank ring-like surface, positioning the skirt top portion around the tank ring-like surface, bringing the skirt top portion or the tank ring-like surface or both to ambient temperature to thereby shrink-fit them together, and joining the skirt top portion to the tank by welds, bolts or rivets.

A metal tank having a circular horizontal section, the tank having a horizontal ring-like portion having a substantially upright surface, and a metal substantially upright skirt having a top portion with an internal surface which matches the tank ring-like surface shrink-fitted around and in contact with the tank ring-like surface.

13 Claims, 15 Drawing Figures

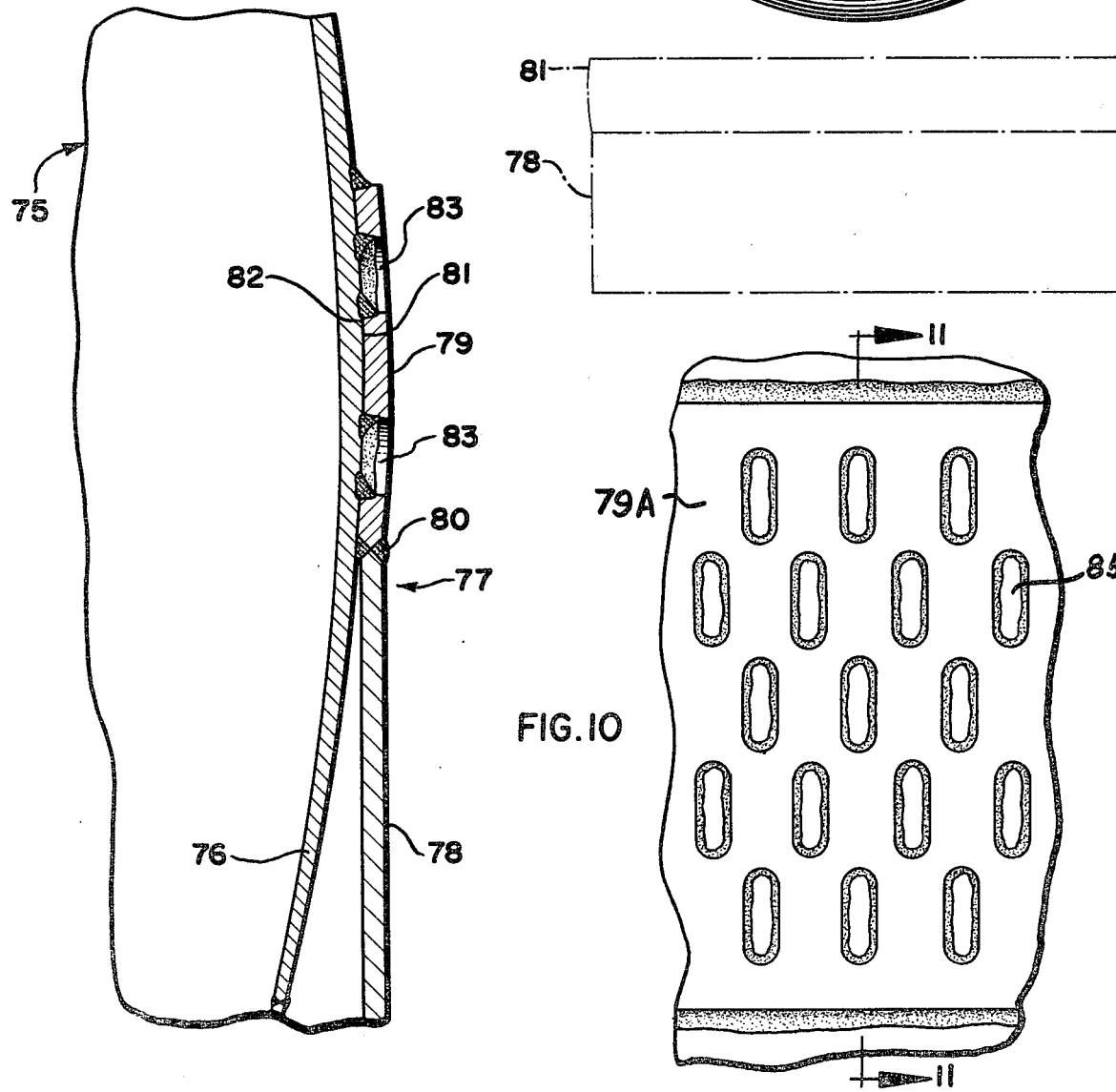

METHOD OF JOINING A TANK AND SKIRT SUPPORT TOGETHER

This invention relates to storage tanks and tank supports. More particularly, this invention is concerned with tanks for storage of materials at temperatures much higher or lower than ambient atmospheric temperatures, and support systems for such tanks, particularly in ships.

A metal storage tank of large size will dimensionally expand and contract substantially with increase or decrease in temperature. Such dimensional changes are unavoidable since a tank will be at ambient atmospheric temperature (10°-30° C.) until it is placed in service, at which time it may be cooled or heated substantially, after which it will return to ambient temperature when removed from storage service. This is particularly so with a tank used to store and transport a liquefied gas, such as liquefied natural gas.

Contraction and expansion of a tank must be accommodated to prevent stresses from developing which lead to failure of the tank or the tank support system. While failure of such a land-based tank is serious, the failure of a ship-based tank could be even more dangerous because it could readily jeopardize the ships's safety. Much study has thus been applied to suitable support for ship tanks.

W. H. Kircik et al. U.S. Pat. No. 3,841,253 shows substantially spherical tanks supported in a ship. Each tank is supported by a plurality of columns each having a key guide at the top which permits radially controlled expansion and contraction of the tank with continual tank support by flexing of the columns.

Miller et al. U.S. Pat. No. 3,908,574 also shows a spherical tank supported in a ship's hold but with a key system between a supporting ledge in the ship's hold and a horizontal girder around the tank. Controlled expansion and contraction of the tank is achieved by sliding between mating vertical key and key-way faces as well as horizontal mating surfaces which permit sliding load-bearing movement.

While the described support systems are useful they are more costly than is desired. Less expensive support means which does not sacrifice strength and safety is desired.

Bognaes et al. U.S. Pat. No. 3,680,323 discloses support of a spherical tank in a ship by means of a cylindrical skirt which joins the tank near the equator. FIG. 7 of the patent shows the skirt upper end joined to the end of the outer leg of an inverted Y-shaped ring integral with the tank. This type of joint requires that it be made by welding together the abutted edges of the ring outer leg and the top edge of the skirt only from the outside since there is insufficient room for a welder to weld from the inside of the skirt. This is generally recognized as less desirable to join abutting edges of plates and the like than a double butt welded joint, which is stronger and easier to inspect. FIG. 6 of the Bognaes et al. patent shows another joint using bolts to join a horizontal girder on a tank to a horizontal flange on top of a cylindrical skirt with a pair of adjustable wedges between the girder and the flange to provide a desirable stress determinant. A bolted joint of this type is expensive to fabricate. Alternative tank support systems and methods are accordingly believed needed.

According to one aspect of the subject invention there is provided, in combination, a metal tank having a circular horizontal section, a horizontal ring-like portion having a substantially upright surface on the tank, and a metal substantially upright skirt having a top portion, with an internal surface which matches the tank ring-like surface, shrink-fitted around and in contact with the tank ring-like surface. The internal diameter of the skirt top portion at ambient temperature is slightly less than the diameter of the tank ring-like surface at a matching location at ambient temperature before being shrink-fitted together. The tank ring-like surface may be vertical and straight and constitute a circular cylindrical surface and the skirt top portion internal surface may be identical. Alternatively, the tank ring-like surface may be substantially upright but arced, such as in the shape of a spherical zone, in a convex direction while the skirt top portion may have a matching concave surface. The major part of the skirt below the top portion can be a vertical cylindrical circular shell, a conical shell or some other such suitable shape. In general, it should be circular in horizontal section.

The first aspect of the subject invention more specifically provides, in combination, a metal tank having a circular horizontal section, a vertical cylindrical surface on the tank, and a metal substantially upright skirt having a top portion shrink-fitted around and in contact with the tank vertical cylindrical surface. The internal diameter of the skirt top portion at ambient temperature is slightly less than the diameter of the tank vertical cylindrical surface at ambient temperature before being shrink-fitted together. Desirably, the tank vertical cylindrical surface has a lateral or radial extension at the top to which the skirt extends. In addition, it is beneficial to have the tank surface depending downwardly from the tank vertical cylindrical portion of decreasing diameter to form a tapered transition surface, which inherently permits telescoping the skirt top portion over the tank cylindrical surface.

According to a second aspect of the invention there is provided a method of supporting a metal tank having a circular horizontal section which comprises providing the tank with a horizontal ring-like portion having a substantially upright surface, forming a metal substantially upright skirt having a top portion with an internal surface which matches the tank ring-like surface and which has an internal diameter at matching locations at ambient temperature slightly less than the diameter of the tank ring-like surface at ambient temperature, heating the skirt top portion, or cooling the tank ring-like surface, or both until the internal diameter of the skirt top portion internal surface is larger than the diameter of the tank ring-like surface, positioning the skirt top portion around the tank ring-like surface, bringing the skirt top portion or the tank ring-like surface or both to ambient temperature to thereby shrink-fit them together, and joining the skirt top portion to the tank by welds, bolts or rivets. The matching skirt and tank portions may be vertical cylindrical surfaces or arced surfaces as, for example, the tank surface may be substantially upright but convex and the skirt top internal surface may be concave but designed to match or nest with the tank convex surface.

The second aspect of the invention more specifically provides a method of supporting a metal tank having a circular horizontal section which comprises providing the tank with a vertical cylindrical surface, forming a metal substantially upright skirt having a top portion with an internal diameter at ambient temperature slightly less than the diameter of the tank vertical cylindrical surface at ambient temperature, heating the skirt top portion, or cooling the tank vertical cylindrical surface, or both until the internal diameter of the skirt top portion is larger than the diameter of the tank vertical cylindrical surface, positioning the skirt top portion around the tank vertical cylindrical surface, bringing the skirt top portion or the tank vertical cylindrical surface or both to ambient temperature to thereby shrink-fit them together, and joining the skirt top portion to the tank by welds, bolts or rivets. The method desirably includes forming a lateral or radial extension at the top of the tank vertical cylindrical surface and positioning the skirt top edge in contact therewith before shrink-fitting the skirt to the tank. The method advisably includes providing the tank with a surface depending downwardly from the tank vertical cylindrical portion of decreasing diameter as a guide surface for positioning the skirt on the tank.

The invention will be described further in conjunction with the attached drawings, in which:

FIG. 7 is an isometric view of a ship similar to FIG. 1 but showing a sixth embodiment of the invention comprising a skirt supporting a spherical tank;

FIG. 8 is an elevational view of the tank and skirt shown in FIG. 7;

FIG. 9 is a sectional view along the line 9—9 of FIG. 8;

FIG. 10 is a partial front elevational view of a seventh embodiment of the invention comprising a tank supported by a skirt;

So far as is practical the same elements or parts which appear in the different views of the drawings will be identified by the same numbers.

Figure 1:
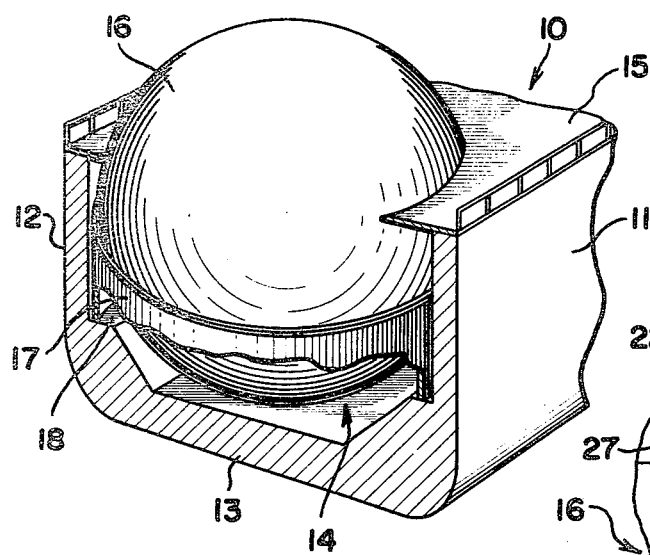
FIG. 1 is a vertical lateral partial sectional view through the hull of a ship showing a skirt supported spherical tank in the hold of the ship.

The portion of the ship 10 shown in FIG. 1 has a hull with sides 11 and 12 and bottom 13 which together form a hold 14 which is covered by deck 15. Spherical metal tank 16 is supported by a vertical cylindrical skirt 17.

The tank 16 has a horizontal circular section and the skirt 17 is joined to the tank about at the equator or a slight distance therebelow. The bottom edge of the skirt 17 is supported on a horizontal circular sub-deck or ledge 18 in the ship hold 14.

Figure 2:
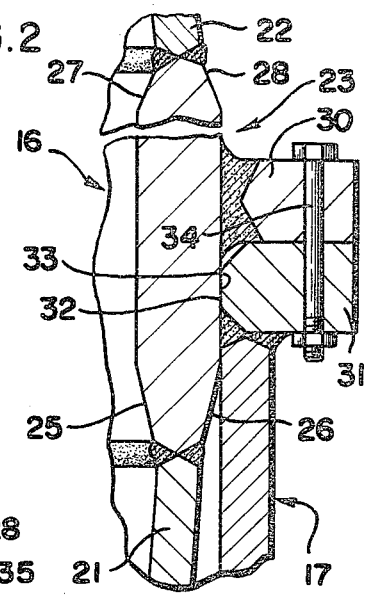
FIG. 2 is a vertical sectional view of the top portion of the metal skirt shrink-fitted to a vertical cylindrical surface on the spherical tank shown in FIG. 1.

One embodiment of joint structure for supporting the tank 16 by skirt 17 which is shrink-fitted to the tank is shown in FIG. 2. The tank 16 is formed of two hemispherical shells 21 and 22 joined together by an intermediate ring 23 butt welded from both sides of the ring and hemispherical shell portions. The body of ring 23 is about twice as thick as the metal plate used in the hemispherical shells 21 and 22. The top and bottom edges of the ring 23 have inwardly tapered transition wall portions 25 and 26 at the lower edge and 27 and 28 at the upper edge. The lateral or radial extension 30 is shown joined by welding to ring 23, although it can be made an integral part of ring 23. Joined to the top edge of skirt 17 by welding is a horizontal laterally extending flange 31 having a top flat surface designed to be placed in face-to-face contact with the flat lower surface of extension 30. The outer surface 32 of the ring 23 is made essentially vertical and forms a cylindrical surface which extends completely around the tank. The inner surface 33 of skirt 17 is also vertical and constitutes a cylindrical surface which extends around the inside top portion of the skirt. The diameter of the internal surface 33 of skirt 17 at an ambient temperature of about 10° to 30° C. has a diameter slightly less than the diameter of the tank vertical cylindrical surface 32 at the same ambient temperature or at any other temperature. Therefore, to bring the two cylindrical surfaces 32 and 33 into mating contact it is necessary to either expand the surface 33 by heating the top portion of the skirt 17 or by cooling the cylindrical surface 32 of the tank or by doing both of these things to temporarily have the skirt cylindrical surface 33 just slightly larger than the tank cylindrical surface 32. Once that state is reached by the described heating and/or cooling or both the tank is lowered to position the skirt cylindrical surface 33 around and adjoining the tank cylindrical surface 32, advisably with the top surface of the flange 31 in contact with the lower surface of extension 30. The skirt top portion and/or the ring 23 or both are then brought to ambient temperature to thereby shrink-fit the top portion of the skirt to the ring 23. One or more bolts 34 may then be used to secure the flange 31 to the extension 30 to restrain the tank against any upward force which may be applied against the tank. In place of bolts, rivets or a suitable weld may be used to join flange 31 to lateral extension 30.

It is to be understood that the ring 23 and the top portion of the skirt must be so dimensioned at ambient temperature as to permit the desired shrinkage of ring 23 and/or the expansion of the top portion of the skirt to obtain the desired shrink-fit. This is considered within the realm of general engineering practice since the coefficient of expansion of the metals employed for the tank and the skirt are well known to those skilled in the art. Furthermore, it is to be understood that the internal stresses developed by the shrink-fit should not be so great as to cause a failure of the metal used in the skirt or in the tank.

The tapered transition surface 26 on the lower outer part of ring 23 in FIG. 2 inherently facilitates sliding the tank into the top portion of the skirt. Furthermore, downward displacement of the tank during the shrink-fitting operation is controlled by the flange 31 which contacts the lower surface of lateral extension 30, thereby limiting any further downward displacement of the tank relative to the skirt.

Figure 3:
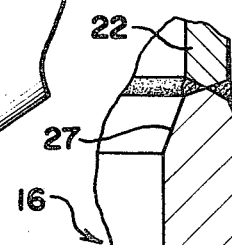
FIG. 3 is a vertical sectional view of the top portion of a metal skirt shink-fitted to a vertical cylindrical portion of a spherical tank.

A second embodiment of the invention is illustrated by FIG. 3. In this embodiment the ring 35 is very similar to the ring 23 shown in FIG. 2. The major difference is that the lateral extension 36 on ring 35 is radially shorter than the lateral extension 30 on ring 23. The skirt 37 is a vertical cylindrical metal plate structure which is reinforced near the top by an external ring 38. The internal surface 39 of skirt 37 is vertical and cylindrical and is shrink-fitted to the vertical cylindrical surface 40 on the lower part of ring 35. The top edge 41 of the skirt is positioned to abut the lower surface of lateral extension 36 and weld 42 joins the edges together to thereby prevent upward displacement of the tank from the skirt.

Figure 4:
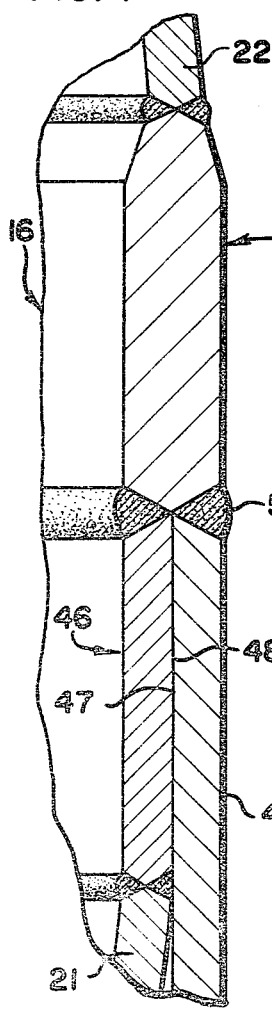
FIG. 4 is a vertical sectional view of a third embodiment of a metal skirt shrink-fitted to a vertical cylindrical portion of a spherical tank.

The third embodiment of the invention as shown in FIG. 4 has an upper ring 45 about twice the thickness of the hemispherical sections 21 and 22 and a lower ring 46 made of metal plate about the same thickness as the lower hemispherical section 21. The outer surface of lower ring 46 is a vertical cylindrical surface 47 onto which the inner vertical cylindrical surface 48 of skirt 49 is shrink-fitted. The top edge of skirt 49 is welded 50 to the lower edge of upper ring 45.

Figure 5:
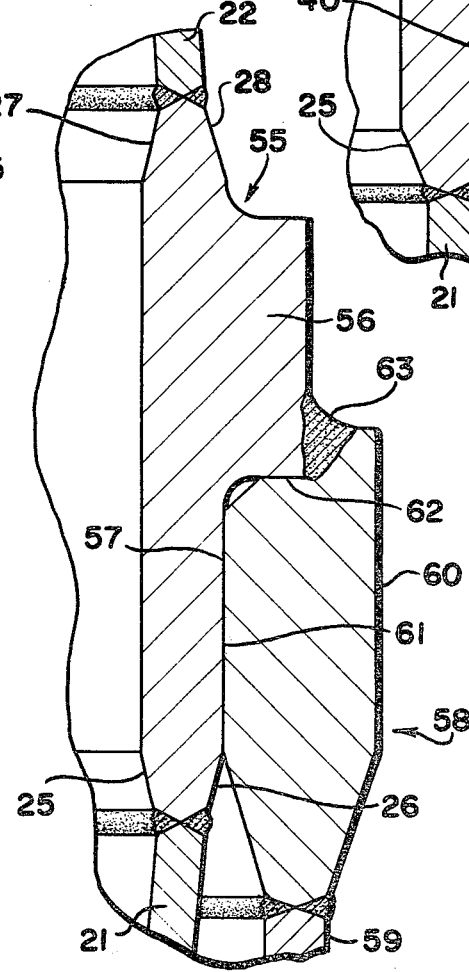
FIG. 5 is a fourth embodiment of a metal skirt shrink-fitted to a vertical cylindrical portion of a spherical tank.

In the fourth embodiment of the invention shown in FIG. 5 ring 55 is welded at its upper edge to hemispherical section 22 and at its lower edge to hemispherical section 21. Integrally formed with ring 55 is lateral extension 56. The lower part of ring 55 below extension 56 is provided with a vertical cylindrical surface 57. Vertical cylindrical skirt 58 has a lower section 59 to the top edge of which a thicker ring 60 is welded. The inner surface of ring 60 is provided with a vertical cylindrical surface 61 which is shrink-fitted to the vertical cylindrical surface 57 on ring 55 in the same manner as described with respect to the embodiment shown in FIG. 2. The surface 62 at the top of ring 60 is placed in abutting contact with the lower surface of lateral extension 56 to thereby help position the tank with respect to the skirt and to prevent further downward movement of the tank. Once the tank has been so positioned the top portion of the skirt or the ring 55 or both are brought to ambient temperature to achieve the desired shrink-fit joint. Weld 63 is then deposited to restrain upward movement of the tank from the skirt.

Figure 6:
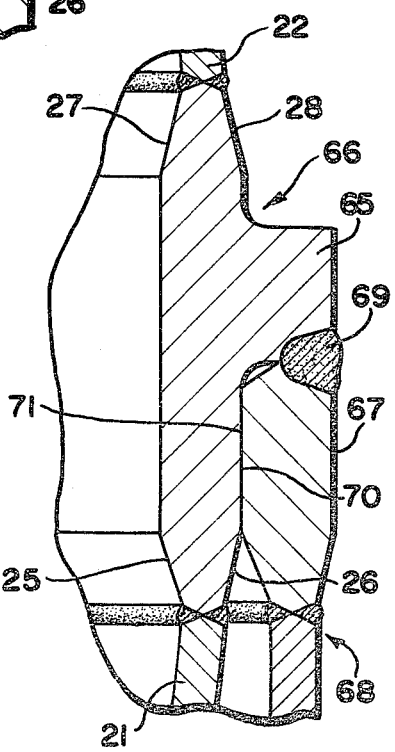
FIG. 6 is a vertical sectional view of a fifth embodiment of a metal skirt shrink-fitted to a vertical cylindrical portion of a spherical tank.

A fifth embodiment of the invention is illustrated by FIG. 6. This embodiment is very similar to the embodiment shown in FIG. 5. The lateral extension 65 on ring 66 used to join hemispherical sections 21 and 22 together has a width equal to the enlarged upper end portion 67 on the top of skirt 68. The vertical cylindrical internal surface 70 at the top of the skirt 68 is shrink-fitted against the vertical cylindrical surface 71 located on the lower part of ring 66 to thereby tightly position the skirt to the tank. Weld 69 joins the top of the skirt to the lateral extension 65.

As shown in FIGS. 7 to 9, the spherical tank 75 has a shell of decreasing thickness 76 beneath the tank shell portion in contact with the supporting skirt 77. Skirt 77 has a lower vertical circular cylindrical portion 78 to which top portion 79 is joined by weld 80. The skirt top portion 79 constitutes a horizontal ring having an internal surface 81 which is concave and essentially constitutes the internal surface of a spherical zone which nests or matches the tank convex surface 82 adjacent thereto. The diameter of the inside surface 81 of ring 79 is made slightly less than the diameter of the convex surface 82 on tank 75 as is shown in phantom in the lower part of FIG. 8. The upper part of the skirt is expanded by heating, or the tank shell is cooled, or both in order for the tank to be lowered into position to place the tank surface 82 in mating position adjacent to the skirt concave surface 81. Once both of the surfaces are at ambient temperature a shrink-fit is obtained which inherently accommodates whatever out-of-roundness may have been in the tank or the skirt from their fabrication. Two rows of circular holes 83 are located in the ring 79. Welds are deposited to join the internal periphery of holes 83 to the tank shell to thereby further secure the skirt to the tank.

Figure 11:
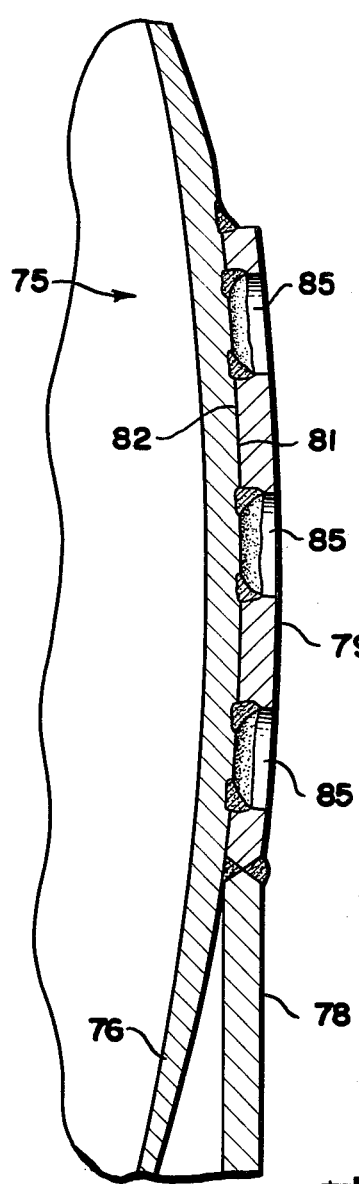
FIG. 11 is a sectional view taken along the line 11—11 of FIG. 10.

The seventh embodiment illustrated by FIGS. 10 and 11 is very similar to the embodiment shown in FIGS. 7 to 9. In the embodiment shown in FIGS. 10 and 11 the ring-like portion 79A at the top of the skirt is identical to ring 79 except that instead of circular holes the ring 79A contains a plurality of rows of staggered vertically oblong cutout portions 85 in which welds are deposited to join the internal periphery of the cutouts in the ring 79A to the tank after the ring has been shrink-fitted thereto.

Figure 12:
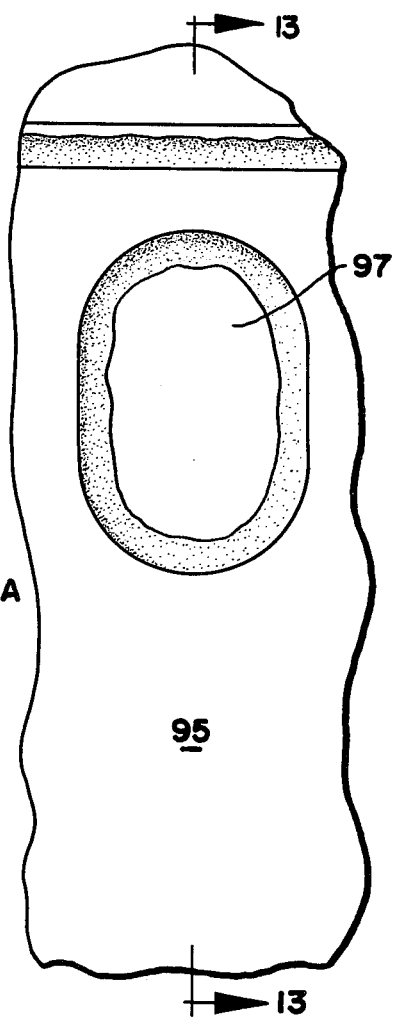
FIG. 12 is an elevational view of the top portion of a skirt supporting a tank and constitutes an eighth embodiment of the invention.
Figure 13:
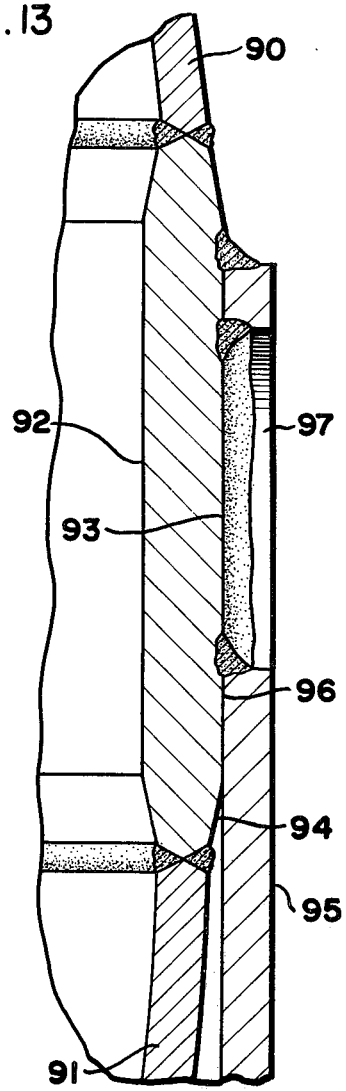
FIG. 13 is a sectional view taken along the line 13—13 of FIG. 12.

An eighth embodiment of the invention is illustrated by FIGS. 12 and 13. In this embodiment two essentially hemispherical metal shells 90 and 91 are joined together by a horizontal circular metal ring 92. Ring 92 has an external vertical circular cylindrical surface 93 with a lower downwardly and inwardly tapered circular portion 94. Vertical metal circular cylindrical skirt 95 has a top portion internal cylindrical surface 96 intended to mate with the surface 93 on the tank in a shrink-fitted condition which is effected as herein previously described. Oblong cutouts 97 are provided in the upper part of the skirt 95 and welds are deposited around the inner periphery of the cutout portions to join the skirt to the ring 92. This embodiment of the invention does not utilize a lateral extension on ring 92 to retard downward movement of the tank when it is positioned inside of the skirt top portion during the shrink-fitting operation. Therefore, suitable markings are to be employed on the tank to properly set the tank relative to the skirt before these elements are brought to ambient temperature to complete the shrink-fitting.

Figure 14:
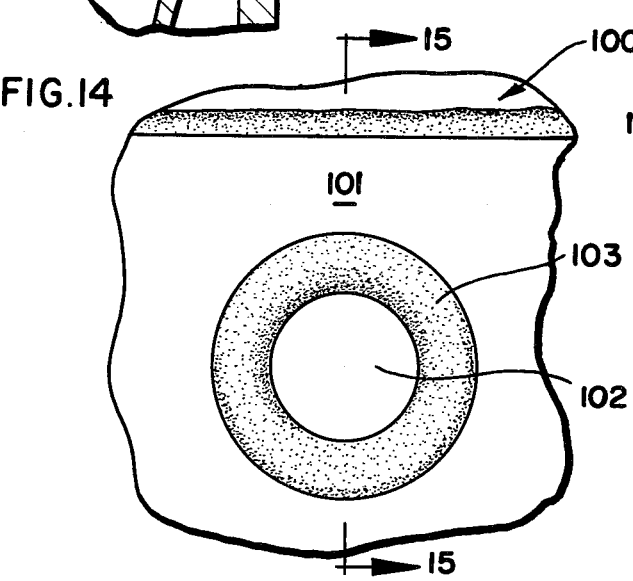
FIG. 14 is an elevational view of the top portion of a skirt support for a tank and constitutes a ninth embodiment of the invention.
Figure 15:
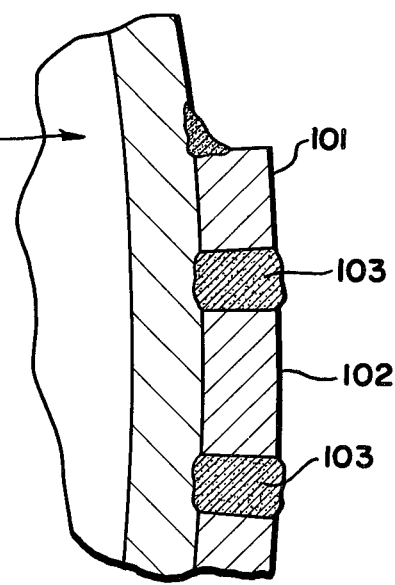
FIG. 15 is a sectional view taken along the line 15—15 of FIG. 14.

The ninth embodiment illustrated by FIGS. 14 and 15 has a spherical tank 100 supported by a skirt having an arced upper portion 101 which is shrink-fitted to the tank. Circular cutouts in the upper portion of the skirt 101 are each filled in by circular discs 102 with a circular weld 103 deposited in the space between each plug 102 and each circular opening in the skirt top portion.

It should be understood that the described tank support systems, although illustrated in combination with spherical tanks, can be used to support other shaped tanks such as those having eliptical, parabolic or conical vertical sections, provided the tanks are circular in horizontal section.

An advantage of the illustrated tank support systems is that the welds can be examined by non-destructive testing, such as by X-ray examination or ultrasonic testing.

The foregoing detailed description has been given for clearness of understanding only, and no unnecessary limitations should be understood therefrom, as modifications will be obvious to those skilled in the art.

What is claimed is:

1. A method of supporting a metal tank having a circular horizontal section which comprises:

providing the tank with a horizontal ring-like portion having a substantially upright surface, forming a metal substantially upright skirt having a top portion with an internal surface which matches the tank ring-like surface and which has an internal diameter at ambient temperature at matching locations slightly less than the diameter of the tank ring-like surface at ambient temperature, heating the skirt top portion, or cooling the tank ring-like surface, or both until the internal diameter of the skirt top portion is larger than the diameter of the tank ring-like surface, positioning the skirt top portion around the tank ring-like surface, bringing the skirt top portion or the tank ring-like surface or both to ambient temperature to thereby shrink-fit them together, and joining the skirt top portion to the tank by welds, bolts or rivets.

2. A method according to claim 1 in which the tank ring-like portion surface is convex and the skirt top portion internal surface is concave and nests with the said tank convex surface.

3. A method of supporting a metal tank having a circular horizontal section which comprises:

providing the tank with a vertical cylindrical surface, forming a metal substantially upright skirt having a top portion with an internal diameter at ambient temperature slightly less than the diameter of the tank vertical cylindrical surface at ambient temperature, heating the skirt top portion, or cooling the tank vertical cylindrical surface, or both until the internal diameter of the skirt top portion is larger than the diameter of the tank vertical cylindrical surface, positioning the skirt top portion around the tank vertical cylindrical surface, bringing the skirt top portion or the tank vertical cylindrical surface or both to ambient temperature to thereby shrink-fit them together, and joining the skirt top portion to the tank by welds, bolts or rivets.

4. A method according to claim 3 including making the tank surface depending downwardly from the tank vertical cylindrical surface of decreasing diameter to form a guide surface for positioning the skirt top portion on the tank.

5. A method according to claim 3 including making the tank with a horizontal metal ring thicker than the tank and with the tank vertical cylindrical surface on the ring.

6. A method according to claim 3 including making the tank with a horizontal metal ring thicker than, and above, the tank portion containing the tank vertical cylindrical surface.

7. A method according to claim 3 including making the top portion of the skirt thicker than the portion of the skirt therebelow.

8. A method of supporting a metal tank having a circular horizontal section which comprises:

providing the tank with a vertical cylindrical surface with a lateral or radial extension at the top, forming a metal substantially upright skirt having a top portion with an internal diameter at ambient temperature slightly less than the diameter of the tank vertical cylindrical surface at ambient temperature, heating the skirt top portion, or cooling the tank vertical cylindrical surface, or both until the internal diameter of the skirt top portion is larger than the diameter of the tank vertical cylindrical surface, positioning the skirt top portion around the tank vertical cylindrical surface with the top of the skirt in contact with the lateral extension of the tank, bringing the skirt top portion or the tank vertical cylindrical surface or both to ambient temperature to thereby shrink-fit them together, and joining the skirt top portion to the tank by welds, bolts or rivets.

9. A method according to claim 6 including making the tank surface depending downwardly from the tank vertical cylindrical surface of decreasing diameter to form a guide surface for positioning the skirt top portion on the tank.

10. A method according to claim 6 including making the tank with a horizontal metal ring thicker than the tank and with the tank vertical cylindrical surface on the ring.

11. A method according to claim 8 including making the lateral extension an integral part of the ring.

12. A method according to claim 6 including making the tank with a horizontal metal ring thicker than and above the tank portion containing the tank vertical cylindrical surface.

13. A method according to claim 6 including making the top portion of the skirt thicker than the portion of the skirt therebelow.

* * * * *